United States Patent [19]
Yasumi et al.

[11] Patent Number: 5,894,528
[45] Date of Patent: Apr. 13, 1999

[54] APPARATUS AND METHOD FOR INSPECTING IMAGE PROCESSING FUNCTIONS

[75] Inventors: Yoshihiro Yasumi; Ryuichi Obata; Eiji Tsurumi, all of Ibaraki-ken, Japan

[73] Assignee: Canon Kabushiki Kaisha, Tokyo, Japan

[21] Appl. No.: 08/414,959

[22] Filed: Mar. 31, 1995

Related U.S. Application Data

[63] Continuation of application No. 08/013,743, Feb. 4, 1993, abandoned.

[30] Foreign Application Priority Data

Feb. 7, 1992 [JP] Japan ................................ 4-022422

[51] Int. Cl.$^6$ .............................. G06K 9/54; G06K 9/60
[52] U.S. Cl. ............................................................ 382/302
[58] Field of Search .................................. 382/302, 307, 382/309, 303, 304, 310, 311; 348/180, 189; 371/3, 24, 25.1; 364/474.19, 551.01, 552, 553

[56] References Cited

U.S. PATENT DOCUMENTS 4,810,958  3/1989  Mogi et al. ............................ 371/25.1
4,901,063  2/1990  Kimura et al. ............................ 382/57
5,327,252  7/1994  Tsuruoka et al. ...................... 382/112
5,394,486  2/1995  Eisenbarth et al. .................... 382/309

*Primary Examiner*—Phuoc Tran
*Attorney, Agent, or Firm*—Morgan & Finnegan LLP

[57] ABSTRACT

Disclosed are an inspection system and method through which the actual operation of an image processing apparatus can be dealt with satisfactorily, and in which the image processing apparatus can be inspected in a short period of time. A work station sends part of a control program, which has been stored in a hard disk, to an interface. In accordance with the control program, the interface sets the operating mode and an inspection image processing area of an item under inspection and requests the work station for test image data to be inputted to the item under inspection. From plural items of image data that have been stored in the hard disk, the work station loads image data requested by the interface, as well as reference data corresponding to this image data, to the interface and a reference-data memory. The interface inputs this test image data to the item under inspection and sends image data, which has been outputted by the item under inspection, to the work station. The work station compares the image data outputted by the item under inspection with the reference data stored in the reference-data memory and judges whether the item under inspection is acceptable or defective.

10 Claims, 5 Drawing Sheets

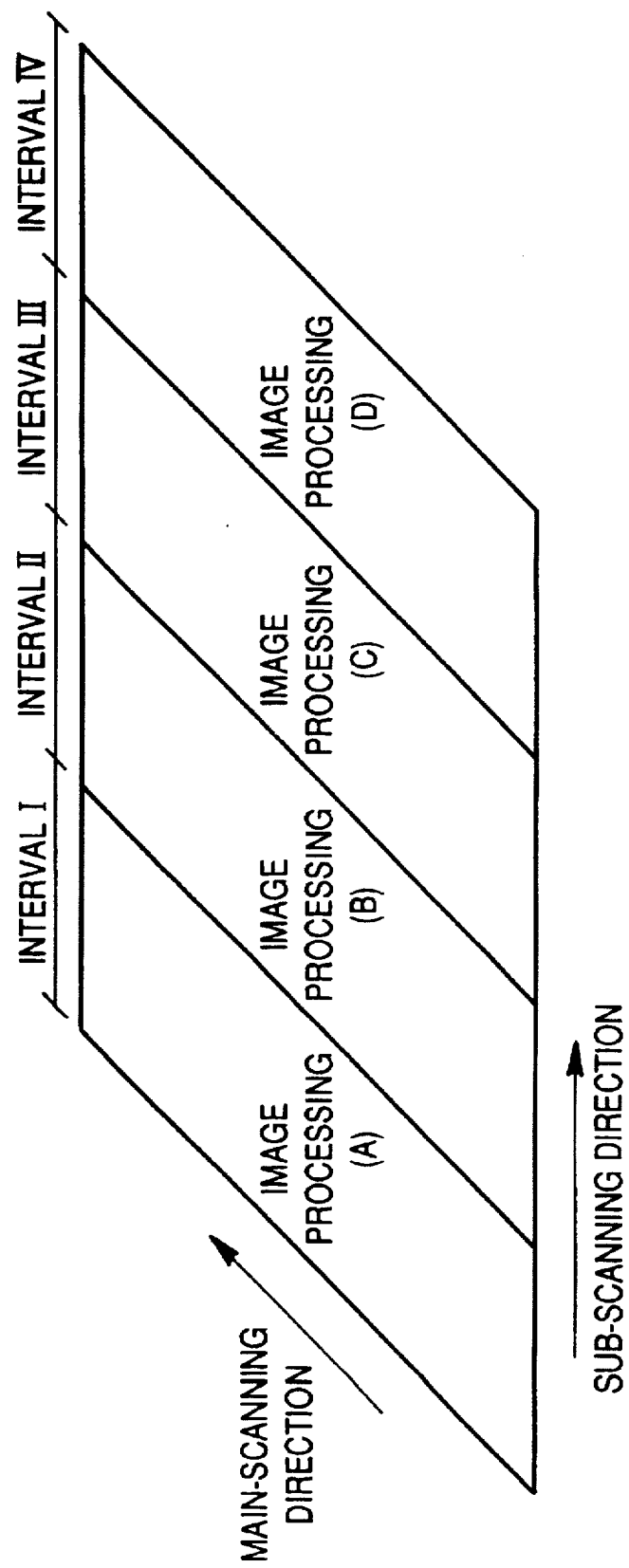

APPARATUS AND METHOD FOR INSPECTING IMAGE PROCESSING FUNCTIONS

This is a continuation of application Ser. No. 08/013,743, filed on Feb. 4, 1993, abandoned.

BACKGROUND OF THE INVENTION

1. Field of the Invention

This invention relates to an apparatus and method for inspecting image processing functions in an image processing apparatus or the like.

2. Description of the Related Art

A process for inspecting an image processing apparatus is divided into three stages, namely inspection of the characteristics of the image processing LSI by the LSI maker (this shall be referred to as "LSI inspection" hereinafter), inspection of the characteristics of a mounted printed circuit board ("PCB inspection" hereinafter), and inspection of the current characteristics when the image processing apparatus is actually operated ("actual-operation inspection" hereinafter).

Owing to advances in image processing function, however, the functions possessed by an image processing apparatus cannot be examined satisfactorily with just an LSI inspection and PCB inspection, and the relative importance of the actual-operation inspection has grown in recent years. More specifically, even if the results of LSI inspection and PCB inspection are normal, there are many instances in which an abnormality is found in the final actual-operation inspection.

Accordingly, in the prior art, an image for verifying picture quality and an image for verifying the image processing function are recorded on recording paper in an image recording process for inspecting final quality, whereby the image processing apparatus is inspected.

However, the following problems arise in the method of inspection described above:

(1) In verifying the image processing function by means of recording the image, it is required that the recording of the image be carried out for every image processing function. This means that paper resources are wastefully consumed in an apparatus such as a copying apparatus that records images on paper.

(2) If the apparatus is one having a low image recording speed, image recording takes considerable time and the cost of inspection is high.

(3) Since a human being judges whether the recorded image is acceptable or not, a variance in judgment from one inspector to another cannot be avoided.

(4) It is difficult to specify whether the cause of a defect is attributable to the electrical system or mechanical system of the image processing apparatus.

In view of the foregoing circumstances, an inspecting apparatus and method through which the actual operation of an image processing apparatus can be dealt with satisfactorily, and in which the image processing apparatus can be inspected in a short period of time, is desired.

SUMMARY OF THE INVENTION

An object of the present invention is to provide an inspection apparatus and method free of the above-described drawbacks of the prior art.

Another object of the present invention is to provide an inspection apparatus and method in which a plurality of image processing functions can be inspected in a short period of time.

According to the present invention, the foregoing objects are attained by providing an inspection apparatus comprising dividing means for dividing an image area into a plurality of image areas, input means for entering data for inspection, in conformity with the image areas divided by the dividing means, to an image processing apparatus having a plurality of image processing means for executing processing operations that differ from one another, and inspecting means for inspecting image processing functions of the image processing means based upon results of processing executed by the image processing means.

Further, according to the present invention, there is provided an inspection method comprising the steps of dividing an image area into a plurality of image areas, executing a plurality of mutually different image processing operations with respect to image areas divided at the dividing step, and inspecting image processing functions of image processing means based upon results of processing executed by the image processing means.

A further object of the present invention is to provide an inspection apparatus and method in which image processing functions can be inspected without a visible representation of image data that has been subjected to image processing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a diagram showing the relationship between an interval signal an image processing operations that are the object of inspection.

DESCRIPTION OF THE PREFERRED EMBODIMENT

A preferred embodiment of the present invention will now be described in detail with reference to the drawings.

Figure 1:
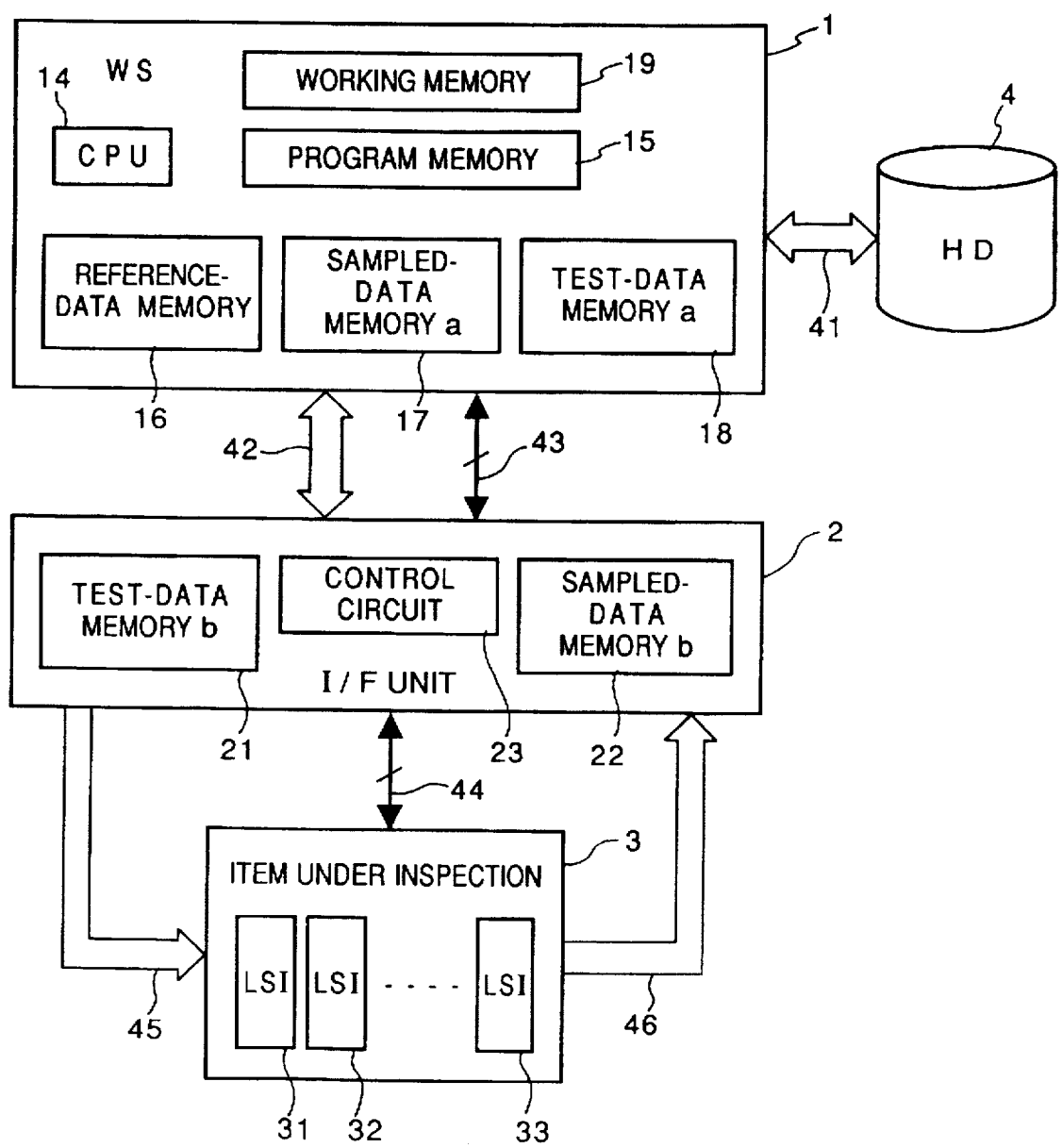
FIG. 1 is a block diagram illustrating the configuration of an embodiment of the present invention.

FIG. 1 is a block diagram illustrating the configuration of this embodiment, in which numeral 1 denotes a work station (hereinafter referred to as a "WS"). By way of example, the WS 1 internally includes a CPU 14 for controlling the WS, a program memory 15 for storing prescribed processing programs, a reference-data memory 16 for storing reference data, a sampled-data memory a17 for storing sampled data, described below, a test-data memory a18 for storing test data, described below, and a working memory 19 used as a working area.

The WS 1 is connected to an I/F unit 2, which performs an exchange of images between the WS 1 and the item to be inspected and controls the item to be inspected. The I/F unit 2 includes a test-data memory b21, a sampled-data memory b22 and a control circuit 23.

Numeral 3 denotes an item under inspection which, by way of example, includes a plurality of image processing LSI's 31 through 33.

A hard disk (hereinafter referred after as an "HD") 4 is connected to the WS 1 via a general-purpose interface 41 such as an SCSI and stores reference data (image data outputted by an acceptable item under inspection), test data (image data inputted to the item 3 under inspection), a control program, etc. The items of reference data and test data are multivalued color image data having a size of 210×80 mm, for example, and approximately 50 types of each of these items of data are stored in the HD in advance.

An inspection sequence will now be described. The inspection sequence is divided into (1) a preparation sequence, (2) a control sequence, (3) a test/sampling sequence and (4) a judgment sequence.

(1) The preparation sequence will be described first.

When the power supplies of the WS 1 and I/F unit 2 are turned ON, the control program stored in the HD 4 is loaded into the program memory 15 of WS 1.

Next, when power is supplied to the item 3 under inspection, the control circuit 23 checks the status of the item 3 under inspection via a control line 44, obtains information (hereinafter referred to as "function information") indicative of the image processing function possessed by the item (LSI's) 3 under inspection and sends the results of the check and the function information to the WS 1. Based upon the results of the check sent from the control circuit 23, the WS 1 judges whether the item 3 under inspection is in the standby state. If the item 3 under inspection is not in the standby state, the control circuit 23 outputs an error message and terminates the inspection sequence. (2) When the preparation sequence ends, the control sequence is executed. This will now be described.

When the start of inspection is commanded by a mouse or keyboard (not shown) connected to the WS 1, the WS 1 transmits part of the control program, which has been stored in the program memory 15, via a data line 42 and a control line 43. The transmitted program is loaded in a program memory (not shown) within the control circuit 23. The other part of the control program resides permanently in the program memory 15 and is used in control of the WS 1, HD 4, I/F unit 2, etc.

The control circuit 23 within which the control program has been loaded operates in accordance with this program and generates an interval signal and synchronizing clock for controlling the LSI's, the test-data memory b21 and the sampled-data memory b22. Furthermore, based upon the above-mentioned function information, the control circuit 23 sets the operating mode of the LSI's as well as an inspection image area and performs ON/OFF control of the image processing functions, etc., of respective ones of the LSI's 31 through 33.

Further, based upon the function information, the control circuit 23 sends a request to the WS 1, via the data line 42 and control line 43, for test data to be inputted to the LSI's. In response to the request for test data, the WS 1 loads the test data and reference data corresponding to this test data from the HD 4 to the test-data memory a18 and reference-data memory 16, respectively, and loads the test data, which has been stored temporarily in the test-data memory a18, in the test-data memory b21 of the I/F unit 2 via the data line 42.

It should be noted that the reason why the test-data memory a18 is made to intervene in order to load the test data from the HD 4 to the test-data memory b21 is to make it possible to utilize a slow data transfer speed in the data line 42 and control line 43 connecting the WS 1 and the I/F unit 2. This embodiment is not limited to such an arrangement, however. In a case where these lines employ a high data transfer speed, the test data can be loaded from the HD 4 to the test data memory b21 without the intervention of the test-data memory a18.

(3) When the control sequence ends, the test/sampling sequence is executed. This will now be described.

The control circuit 23 sends the test data from the test-data memory b21 to the LSI's via the data line 45 in synchronism with the synchronizing clock during the ON period of the interval signal. Further, the control circuit 23 stores the image data, which is outputted by the LSI's, in the sampled-data memory b22 via a data line 46 in synchronism with the synchronizing clock. It should be noted that the image data outputted by an LSI is data obtained by image processing that the LSI has applied to the test data. Further, the interval signal is turned ON within the range of the inspection image area.

FIG. 5 illustrates the relationship between the interval signal and the inspection image area. By way of example, assume that A3 is the size of the image capable of being processed by the image processing apparatus that is the object of inspection. The control circuit 23 divides this size as shown in FIG. 5, by way of example, and outputs an interval signal in such a manner that image processing operations A through D, which are executed by LSI's that differ from one another, will be performed in the intervals I through IV, respectively. The dividing of the image area is performed in the sub-scanning direction of, e.g., a copying apparatus. As a result, it is unnecessary to change over the types of image processing operations in the main-scanning direction. This simplifies the inspection procedure.

(4) When the test/sampling sequence ends, the judgment sequence is executed. This will now be described.

When the interval signal is turned OFF, the control circuit 23 sends the image data stored in the sampled-data memory b22 to the sampled-data memory a17 of the WS 1 via the data line 42.

It should be noted that the reason why the sampled-data memory b22 is made to intervene in order to load the sampled data from the LSI's to the sampled-data memory a17 is to make it possible to utilize a slow data transfer speed in the data line 42 and control line 43 connecting the WS 1 and the I/F unit 2. This embodiment is not limited to such an arrangement, however. In a case where these lines employ a high data transfer speed, the sampled data can be loaded from the item under inspections to the sampled-data memory a17 without the intervention of the sampled-data memory b22.

Next, the CPU 14 of the WS 1 judges the acceptability of the LSI's by comparing the data stored in the reference-data memory 16 and the data stored in the sampled-data memory a17. However, since the item 3 under inspection possesses a plurality of functions (i.e., since it contains a plurality of image processing LSI's), all of the functions (LSI's) cannot be inspected in a single cycle of the inspection sequence. Accordingly, if the present inspection sequence is for inspecting the first LSI (e.g., the LSI 31), for example, the acceptability of the first LSI 31 is judged first. When this judgment ends, then the inspection sequence for the next LSI is executed, and so on. The judgment on the acceptability of the item 3 under inspection is made when the inspection sequences for all of the LSI's have ended.

In order to inspect the LSI's individually, the image processing functions of the LSI's on either side of the LSI of interest must be prevented from operating so as to maintain the independence of the inspection of the image processing function of interest. Further, a program present within an LSI as firmware is provided with an inspection mode executed in the same manner as the actual operating state even if a load such as a sensor or motor associated with the LSI has not been connected.

The inspection sequence has been described above in line with the configuration of the hardware. Reference will now be made to the flowcharts of FIGS. 2 and 3 to describe an example of an inspection sequence in line with the flow of the inspection.

Figure 2:
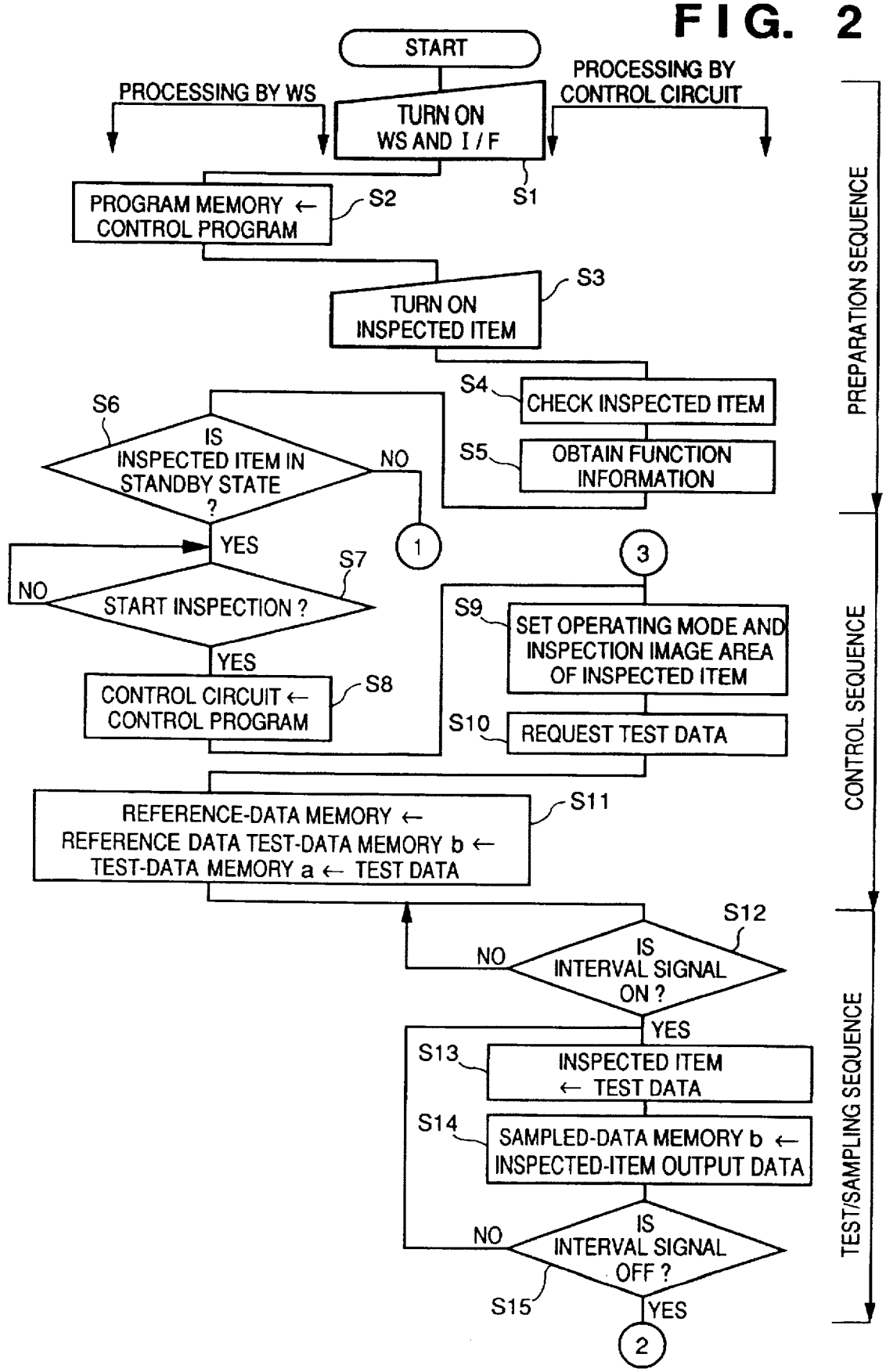
FIG. 2 is a flowchart of an inspection sequence.
Figure 3:
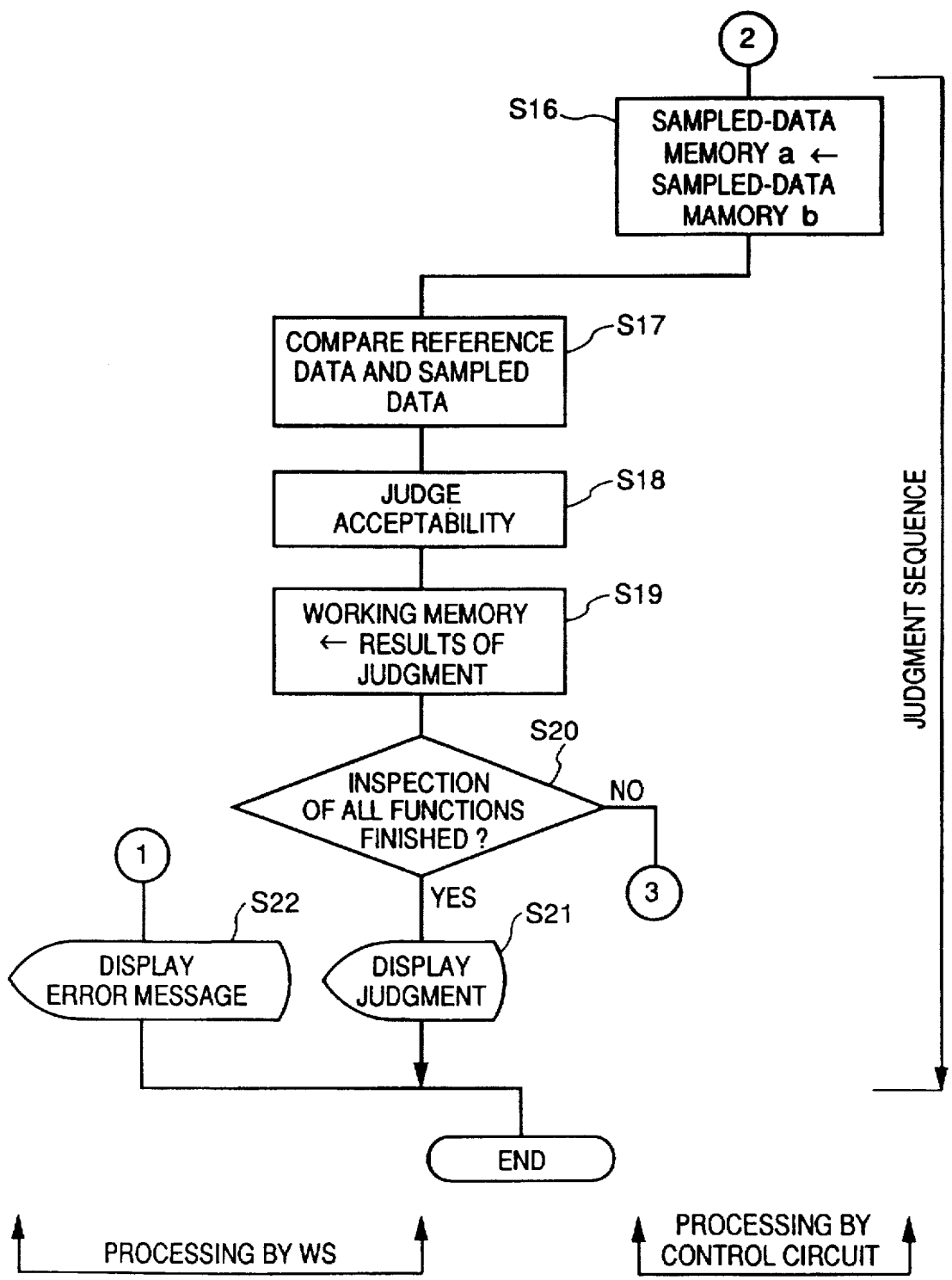
FIG. 3 is a flowchart of an inspection sequence.

In FIGS. 2 and 3, the left side represents processing executed mainly by the WS 1, and the right side represents processing executed mainly by the control circuit 23. Steps S1 through S6 in these flowcharts corresponds to the preparation sequence, steps S7 through S11 to the control sequence, steps S12 through S15 to the test/sampling sequence, and steps S16 through S21 to the judgment sequence.

When the power supplies of the WS 1 and I/F unit 2 are turned on at step S1, the control program is loaded in the program memory 15 at step S2. When power is supplied to the LSI of interest at step S3, the control circuit 23 checks the status of this LSI at step S4 and acquires the function information at step S5. Based upon the result of the check performed by the control circuit 23, the WS 1 determines whether the LSI of interest is in the standby state. If it is determined that the LSI is in the standby state, the program proceeds to the next step. If it is determined that the LSI is not in the standby state, an error message is displayed at step S22 and the inspection sequence is terminated.

The WS 1 waits at step S7 for a command to start inspection. When start of inspection is commanded, part of the control program is sent to the control circuit 23 at step S8. The control circuit 23, which operates in accordance with the sent control program, sets the operating mode and the inspection image area of the LSI of interest at step S9 and, at step S10, requests the WS 1 for test data corresponding to the function information that has been acquired. Next, at step S11, the WS 1 loads the requested test data and reference data corresponding to this test data in the test-data memory a18 and reference-data memory 16, respectively, and loads the test data in the test-data memory b21.

When the interval signal is turned ON at step S12, the control circuit 23 sends the sampled data in the sample-data memory b22 to the sampled-data memory a17 of the WS 1 at step S16. The WS 1 compares the reference data and the sampled data at step S17, judges the acceptability of the LSI at step S18 and stores the result of judgment in the working memory, for example, at step S19. As for the methods of comparison and judgment performed at steps S17 and S18, items of data having the same addresses in the reference-data memory 16 and sampled-data memory a17 are compared one at a time and the coincidence/non-coincidence thereof is determined. If the items of data for which non-coincidence is determined exceeds a preset upper-limit value, the LSI is judged to be defective.

Next, based upon the function information, the WS 1 determines at step S20 whether inspection of all of the LSI's has ended. If it is judged that an LSI to undergo inspection still remains, the program proceeds to step S9. If inspection of all LSI's is determined to have ended, the results of judgment that have been stored in the working memory 19 are displayed at step S21 and the inspection sequence is terminated.

Figure 4A:
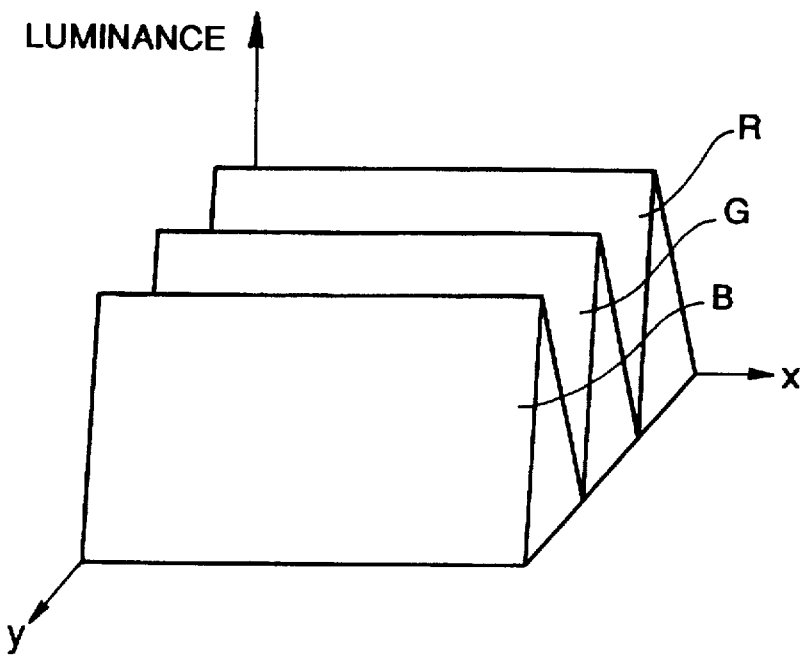
FIG. 4 is a diagram illustrating an example of test data.
Figure 4B:
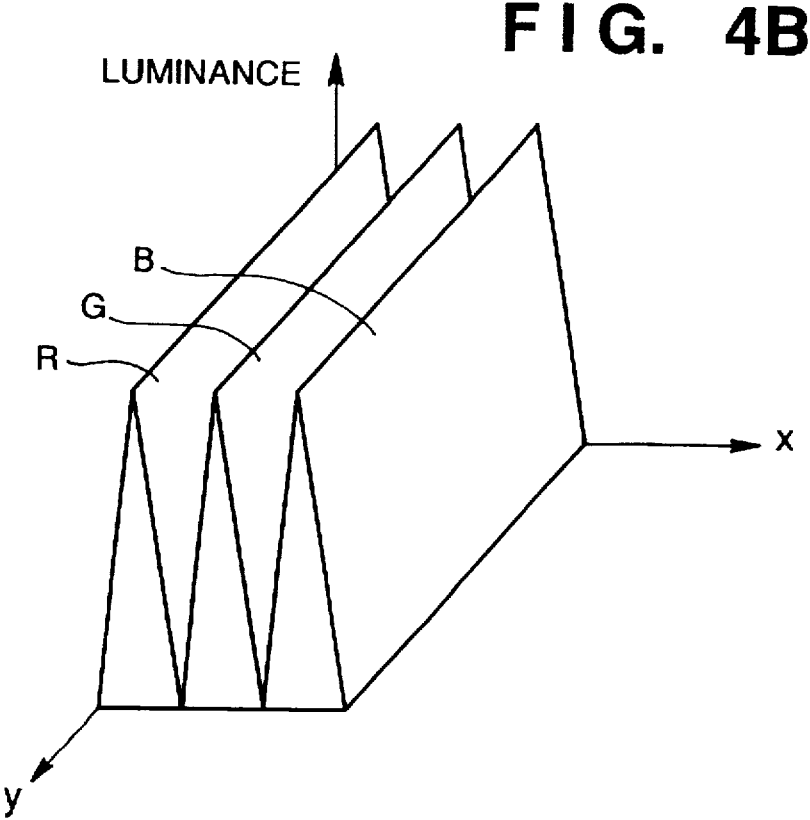

FIG. 4 is a diagram showing an example of test data. The coordinates of the data are represented along x and y axes, and the luminance of the image data is represented along the z axis. FIG. 4 illustrates an example of eight-bit color image data, though this embodiment is not limited to this arrangement.

Since a large majority of the image processing functions are of a type dependent upon main scanning or sub-scanning, all of the RGB luminance data can be introduced in each of the scanning directions in simple test data of the kind shown in FIG. 4, and a satisfactory inspection can be carried out. However, in image processing based upon the error-diffusion method, singular-point elimination or mean-density preservation, effects due to the peripheral image are great, and therefore test data in conformity with respective ones of these image processing methods is prepared.

The image processing operations dealt with in the present invention are as follows, by way of example: (1) white-level/black-level correction of a CCD-sensor output; (2) MTF correction; (3) color-shift correction; (4) image editing processing such as compression/decompression, log conversion, gamma conversion and masking; and (5) a connecting correction between bands and head shading when performing multi-nozzle printing in a so-called bubble-jet type ink-jet printer.

An example in which the WS 1 and I/F unit 2 are separate is set forth in the foregoing description and in FIG. 1. However, the inspection system can be one in which both of these components are combined into a single unit, by way of example.

Further, in the foregoing description and FIG. 1, the example set forth is one in which the control program and test data are stored in the HD 4. However, memory media such as a RAM backed up by a battery, an optical disk or a photomagnetic disk can be employed instead of the HD 4, by way of example.

Furthermore, in the foregoing description and FIG. 1, the example set forth is one in which the setting of the inspection mode of the inspected item 3 is carried out by the control circuit 23 via the control line 44. However, this can be carried out by a human being operating a DIP switch or keypad incorporated within the item 3 under inspection.

The present embodiment described above provides the following advantages:

(1) There is no need to output an image for every image processing function, and paper resources can be conserved in a copying apparatus that outputs an image on paper.

(2) Since recording of images is unnecessary, an increase in inspection time and a rise in inspection cost can be prevented even in an apparatus having a low image recording speed.

(3) Since the acceptability of the results of image processing is judged by a combination of the WS and control program, there is no variance in the results of judgment. Further, the reference data and the data obtained by sampling the results of image processing can be compared one bit at a time. Therefore, in a case where an image output is inspected visually, problems that would otherwise not be found can be discovered. This makes it possible to improve the quality of the item under inspection.

(4) Since inspection is performed in units of image processing functions (LSI's), it is easy to specify the cause of a defect.

(5) Since the image processing area is inspected upon being divided, inspection can be carried out using a memory whose capacity is smaller than that in a case where the entirety of the image processing area is inspected en masse.

(6) Image processing functions can be set and examined independently for each of a plurality of areas resulting from dividing. By combining a plurality of areas to construct a full area, image processing functions of dozens of types can be examined in a short period of time approximately equivalent to the man-hours for outputting a single image.

The present invention can be applied to a system constituted by a plurality of devices or to an apparatus comprising a single device. More specifically, an arrangement may be adopted in which the functions of the WS 1 and I/F interface unit 2 are provided within a copying apparatus, thereby making it possible for the copying apparatus to self-diagnose its own image processing functions.

Furthermore, it goes without saying that the invention is applicable also to a case where the object of the invention is attained by supplying a program from a storage medium to a computer system or copying apparatus.

Thus, in accordance with the present invention, there can be provided an inspection system and method in which an image need not be outputted for each and every image processing function.

The present invention is not limited to the above embodiments and various changes and modifications can be made within the spirit and scope of the present invention. therefore, to apprise the public of the scope of the present invention the following claims are made.

What is claimed is:

1. An inspection apparatus for inspecting operation of an image processing apparatus which includes plural image processing means, comprising:

obtaining means for obtaining function information of said plural image processing means;

supplying means for supplying plural test signals to said image processing apparatus in accordance with the function information obtained by said obtaining means, each of the plural test signals being suitable to test each of said plural image processing means;

inputting means for inputting control signals for independently controlling said plural image processing means, to said image processing apparatus so that one of the plural test signals is processed by one of said plural image processing means and not by another one of said plural image processing means; and evaluating means for evaluating signals outputted from said image processing apparatus.

2. The apparatus according to claim 1, wherein said supplying means includes means for storing the plural test signals.

3. The apparatus according to claim 1, wherein said plural image processing means are LSI's.

4. The apparatus according to claim 1, wherein the plural test signals are color image signals.

5. The apparatus according to claim 1, wherein the control signals comprise commands.

6. An inspection method for inspecting operation of an image processing apparatus which includes plural image processing units, comprising the steps of:

obtaining function information of said plural image processing units;

supplying plural test signals to said image processing apparatus in accordance with the obtained function information, each of the plural test signals being suitable to test each of said plural image processing units;

inputting control signals for independently controlling said plural image processing units, to said image processing apparatus so that one of the plural test signals is processed by one of said plural image processing units and not by another one of said plural image processing units; and evaluating signals outputted from said image processing apparatus.

7. The method according to claim 6, wherein said supplying step includes a step of storing the plural test signals.

8. The method according to claim 6, wherein said plural image processing means are LSI's.

9. The method according to claim 6, wherein the plural test signals are color image signals.

10. The method according to claim 6, wherein the control signals comprise commands.

* * * * *

UNITED STATES PATENT AND TRADEMARK OFFICE
CERTIFICATE OF CORRECTION

PATENT NO. : 5,894,528
DATED : April 13, 1999
INVENTOR(S) : Yoshihiro Yasumi et al.

It is certified that error appears in the above-identified patent and that said Letters Patent is hereby corrected as shown below:

Column 4, line 47; delete "item under inspections" and insert therefor -- item under inspection 3 --.

Column 7, line 26, delete "therefore" and insert -- Therefore --.

Signed and Sealed this

Fifteenth Day of August, 2000

Attest:

Q. TODD DICKINSON

Attesting Officer

Director of Patents and Trademarks